United States Patent Office 3,208,425
Patented Sept. 28, 1965

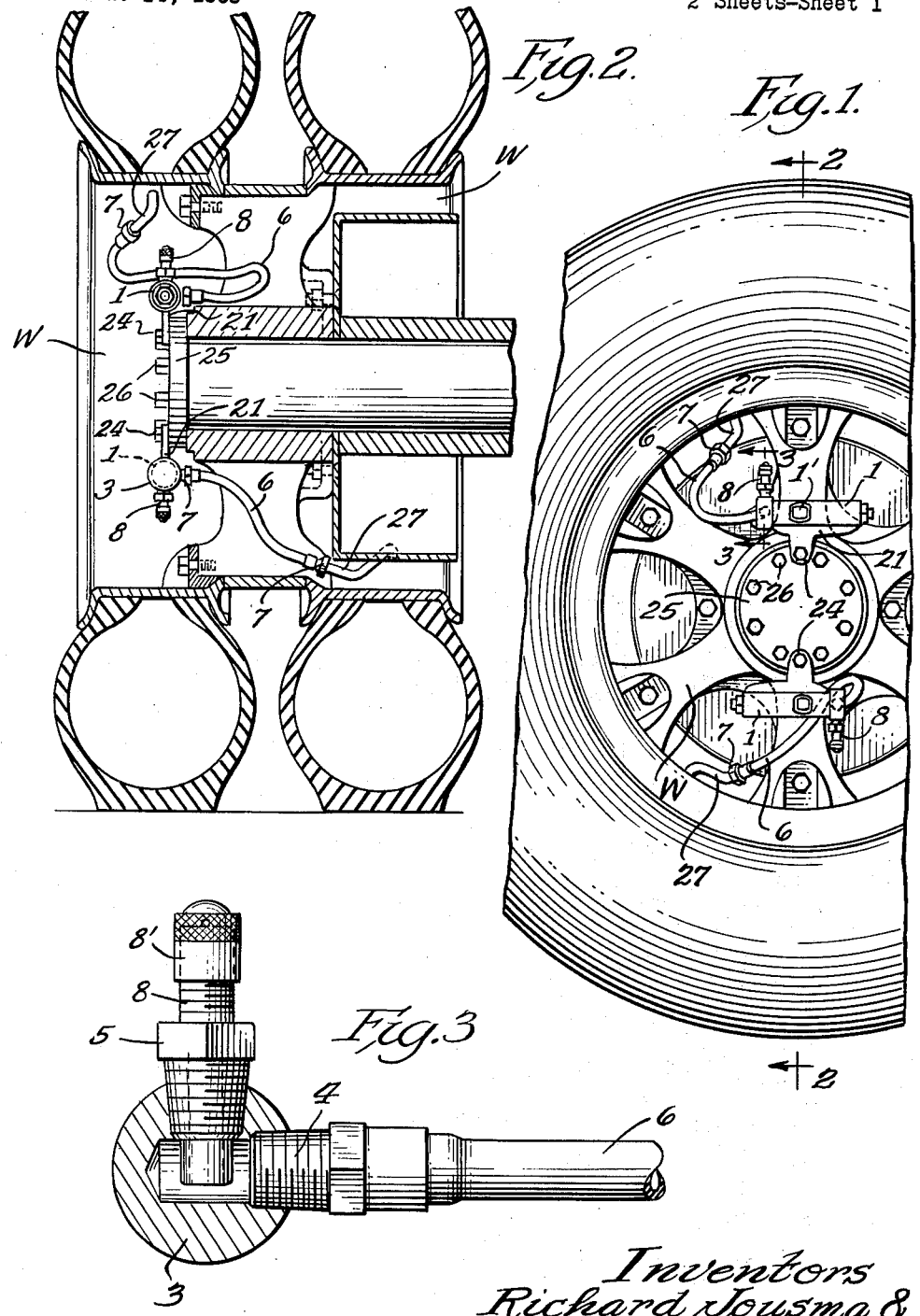

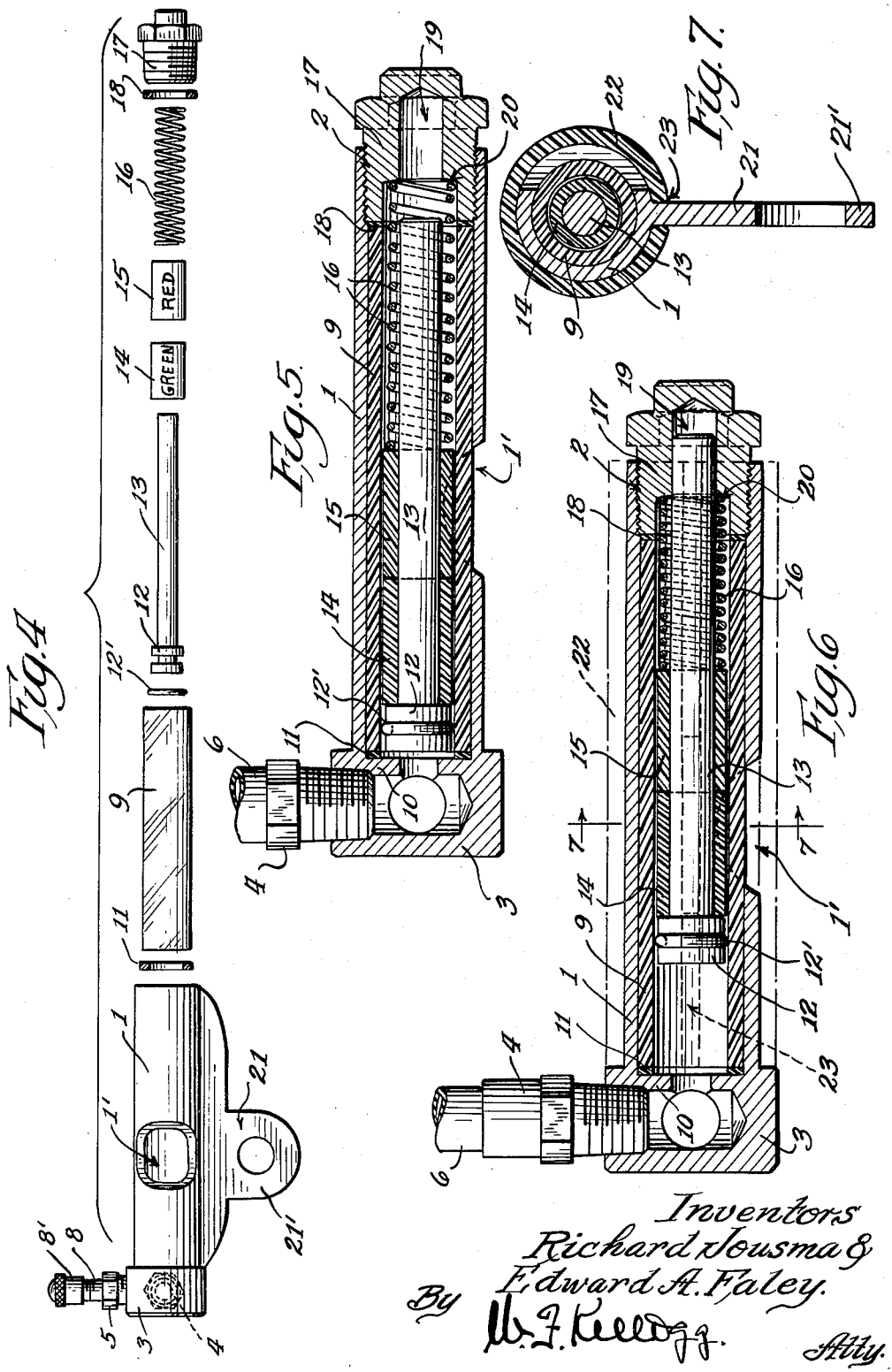

3,208,425
PRESSURE INDICATOR FOR PNEUMATIC TIRES
Richard Jousma and Edward A. Faley, Chicago, Ill., assignors, by mesne assignments, to Berg Mfg. & Sales Co., Des Plaines, Ill., a corporation of Illinois
Filed June 14, 1963, Ser. No. 287,838
7 Claims. (Cl. 116—34)

This invention relates to improvements in a pressure actuated device particularly advantageous for use in connection with the pneumatic tires of motor driven trucks as well as other types of motor driven vehicles, whereby the pressure of air within an equipped tire may be conveniently, readily and accurately ascertained, this in order that the normal or recommended air pressure therewithin may and will be visually advised and maintained constant and thus, corrective of the hazards of over or under inflation.

A principal object of the invention resides in the provision of a visual indicating or tell-tale device of the stated character which when operatively connected to a pneumatic tire, will be conveniently and immediately available for observation or reading, regardless of the position of the tire and/or a wheel mounting the same.

Another and equally important object of the invention is to provide a visual air pressure indicator for pneumatic tires which, by reason of its construction, can and will be securely connected to and solidly supported upon an appropriate portion of the axle flange of a tire carrying or mounting wheel, or upon an appropriate portion of the wheel, thus assuring its effective operation; furthermore, without in any manner interfering with rotation or rolling of the wheel; such being in advantageous and beneficial contradistinction to those types of pressure indicators which are attached directly to the valve assemblies of pneumatic tires, especially to the extent, amongst others, that an equipped tire may be readily dismounted from its wheel without disturbing or harming said indicator, and by the same token, mounted or remounted on the wheel and connected or reconnected to the indicator.

It is also an object of the invention to provide a pneumatic tire air pressure indicating device which, because of its secure and solid mounting on the axle flange or other suitable portion of a pneumatic tire equipped wheel, will be subjected to far less shock, stress and wear during the periods of its rolling over roadways or terrain, especially as and when it traverses pitted, rutted, rock surfaced, or snow or slush covered ways; hence, assuring the giving of prolonged accurate and effective service.

A further object of the invention is to provide an indicator of the stated character which, when mounted in operative position and connected to a pneumatic tire, should it become necessary to increase or decrease the air pressure within said tire, such can be conveniently and readily effected without disconnecting the indicator from the tire or in any manner disturbing the same, hence, eliminating the hazard of resultant detriment to or inaccurate functioning of its working parts.

Yet another object of the invention is to provide a pneumatic tire air pressure indicator or tell-tale device whose working parts are few and simple, are of dependable, rugged and sturdy construction entirely capable of withstanding the normal and abnormal rigors of usage and/or severities to which devices of this character are and will be subjected, and which, if required, may have its working parts easily and quickly replaced or cleaned.

A still further object of the invention is to provide a pneumatic tire air pressure gauge so constructed that it can be mounted on the dual wheels of heavy duty types of motor trucks, and when mounted, will be conveniently and readily accessible for viewing.

Furthermore, it is an object of the invention to provide the air pressure indicating means, per se, within the casing or housing therefor with a secondary and transparent casing or housing means whereby to augment or improve its protection and/or the exclusion of foreign matter or moisture such as may or would be detrimental to the positive and satisfactory operation thereof.

The foregoing, as well as other objects, advantages and meritorious teachings of our invention will be in part obvious and in part pointed out in the following detailed disclosure thereof, when taken in conjunction with the accompanying drawings, it being understood that the form and the adaptation of the invention presented herein is substantially precise and what is now considered to be the best mode of embodying its principles and usages, but that other modifications, changes and usages may be made without departing from its essential features.

In the drawings:

FIGURE 1 is a fragmentary side elevation of a vehicle (truck) wheel mounted pneumatic tire equipped with our improved air pressure indicators connected to or mounted on the wheel axle flange, one indicator being connected to the valve of the illustrated tire and the other, to the valve of the inwardly and unseen juxtaposed tire of usual dual vehicle (truck) wheels.

FIGURE 2 is a vertical transverse section through the dual or juxtaposed pneumatic tire mounting wheels, such as are common to certain types of motor driven trucks, and the floating or removable axle thereof, showing our pressure indicators in end elevation and mounted on the axle flange and connected to their respective tire air valves.

FIGURE 3 is a detail in transverse section through the body or housing of the pressure indicator device showing a portion of its tire valve connecting hose or flexible conduit and its air ingress and egress valve and their communication with the interior or chamber of said body or housing.

FIGURE 4 is an exploded side elevation of the pressure indicator showing its body or housing and working parts assembly.

FIGURE 5 is an enlarged longitudinal section through the pressure indicator wherein the air pressure actuated piston, movable within the housing, is positioned to indicate a condition of under inflation of a pneumatic tire.

FIGURE 6 is a view similar to FIGURE 5, but wherein the air pressure actuated piston is positioned within the housing to indicate a recommended air pressure inflation of a pneumatic tire, and, FIGURE 7 is a transverse section taken on the line 7—7 of FIGURE 6, looking in the direction in which the arrows point.

Referring in detail to the drawings, the invention generally comprises a housing 1 preferably of tubular form having a window 1' therein intermediately of its ends, one end of the housing being open and internally screw-threaded, as at 2, and its other end enlarged, as at 3. Said enlarged end has relatively right angularly arranged internally threaded openings therein, each having nipples 4 and 5 engaged therein. A hose or flexible conduit 6, of appropriate length, is connected at one end to the nipple 4 and has a screw-threaded tire valve connecting fitting 7 on its remaining end.

The nipple 5 fixedly receives a conventional type of spring loaded check valve, such, for example, as a Schrader check valve, indicated at 8, equipped with the usual threadedly engaged cap 8'.

The openings in the enlarged end 3, as will be noted upon reference to FIGURES 5 and 6 of the drawings, communicate with the interior of the tubular housing 1.

Received snugly within the housing 1 is a transparent tube 9 whose inner end abuttingly engages an annular shoulder 10 integral with the tubular body interior in spaced relation to the outer side of its enlarged end 3, while its outer end is spaced inwardly from the internally threaded outer and open end thereof, the purpose of which will be hereinafter described. Fluid tight engagement of the transparent tube end with the annular shoulder 10 is attained by the interpositioning of a suitable gasket 11.

In order that air pressure indicating means, per se, will be provided to the housing 1, a piston 12 is snugly and slideably received within the tubular body, having a suitable sealing ring 12' engaged thereabout and contacting the housing inner surface. The rod 13 of the piston is of a length substantially corresponding to that of the transparent tube and of a lesser diameter.

Juxtaposed sleeves 14 and 15, the combined lengths of which are less than that of the piston rod, are received on the inner portion thereof with the outer end of the sleeve 14 in abutting engagement with the piston 12. Preferably, the exterior surfaces of the sleeves are of different colors, that of the sleeve 14 being green and that of the sleeve 15 being red.

A coiled spring 16 of predetermined compressive force and of appropriate length is engaged over the outer end portion of the piston rod 13, having its inner extremity in bearing engagement with the adjacent end of the sleeve 15.

To close the open outer end of the tubular housing 1, a screw-threaded plug 17 is provided and is turned into engagement with its internally screw-threaded end portion 2. Preferably, a packing gasket 18 is interposed between the inner end of said plug and the adjacent end of the transparent tube 9; it being noted in this connection, that the inner end of the plug thus has fluid tight bearing engagement with and upon the adjacent end of said tube. An inwardly opening chamber or pocket 19 of circular form and of diameter slightly greater than that of the piston rod 13 is formed within the closure plug, permitting the outer end portion of the piston rod 13 to have slideable entry thereinto, at times, while the resultant shouldered portion 20 provides an adequate seat for receiving the outer or adjacent end of the coiled spring 16 and, of course, maintaining it in compressive engagement with the aforesaid exteriorly colored sleeves 14 and 15.

Fixed or secure mounting of the air pressure indicating device in an operative or functioning position upon the pneumatic tire mounting wheel of a vehicle or upon the axle flange therefor may, obviously, be effected in various manners. However, in the herein shown and described embodiment of our invention, such mounting is shown to be effected by providing a mounting bracket or fixture 21 to the housing 1, the same being integral with said housing or welded or otherwise fixedly connected thereto. An extended portion 21' thereof is apertured and flat, permitting it to be engaged over and with an axle flange securing bolt, or if desired, with a wheel mounting securing bolt (the last mentioned being not shown).

In some, if not all, instances of use of our pneumatic tire pressure indicating device or devices, it may be desirable to provide the same with protective covers. Toward such end or ends, a cross-sectionally circular tubular transparent sleeve 22, slotted throughout its length, as at 23, and of an inside diameter to snugly engage about and over the length of the device housing 1 may be employed. Obviously, by reason of its lengthwise slot 23, the cover may be slideably and frictionally engaged over and with said housing 1 for its entire length. As and when desired, the cover may be conveniently and readily removed. Being transparent, it will not interfere with nor prevent viewing of the exteriorly colored sleeves 14 and 15 as the same may or will appear before the housing window 1'.

When installing the invention upon the dual or juxtaposed pneumatic tire mounting wheels of a motor driven vehicle, as shown in FIGURES 1 and 2 of the drawings and indicated at W, two thereof are mounted on and adjacent the uter ne with their windows facing outwardly. Thus, they are conveniently and readily viewable. This mounting is effected by engaging securing bolts 24 through the apertured extensions 21' of the brackets 21 and in and with appropriate portions of the wheels axle flange 25 (see FIGURE 1). Thereby, the devices will be firmly and solidly connected to and supported with relation to said wheels. Of course, if desired, instead of the bolts 24, two of the usual axle flange bolts 26 which are employed to connect the axle to the outermost wheel may be engaged through the extensions 21' of the brackets 21 in so long as they are in such relation that said devices will be easily and effectively viewable by an inspecting person. With the devices thus mounted, the hoses or flexible conduits 6 of each are appropriately adjusted and have their connecting fittings, respectively, connected to or with the tire valves 27 of the pneumatic tires, i.e., the inner and outer wheel carried tires.

As and when the pressure of air within the equipped tires accords with that recommended, the pneumatic head existing in the housings 1 inwardly of the pistons 12 will exert thrust thereupon causing them to counter the predetermined compressive forces of their respective coiled springs 16 and move said pistons within the housings to positions where the green sleeves 14 will register with the housing windows 1', as shown in FIGURE 6 of the drawings. Conversely, when the pressure of air in said tires is less or materially less than that which is recommended, creating a condition of under inflation of the tires, the forces of the coiled springs will be such as to counter the then existing lesser pneumatic head and move the housing pistons 12 inwardly to positions where the red sleeves 15 will be registered with the housing window 1', as indicated in FIGURE 5 of the drawings, thus clearly showing or effecting a tell-tale of such under inflation condition and the hazards associate therewith.

By the same token, should the air pressure or pneumatic head exerted on the device pistons 12 be of an intermediate degree, i.e., between satisfactory and unsatisfactory of the equipped tires, portions of both the green and red tell-tale sleeves 14 and 15 will be exposed through the housing windows 1' indicating a probable need for corrective inflation.

Obviously, to inflate tires equipped with our invention, an air supply hose (not shown) is engaged with or tapped onto the spring loaded check valves 8, while to deflate them it is only required that the check valves be unseated and opened in the usual manner whereby to bleed excess air pressure from the tires.

Whereas we have hereinbefore described our improved pressure indicator for pneumatic tires as being adapted or used upon the pneumatic tires of dual or juxtaposed vehicle wheels, it will be understood and appreciated that it may be as advantageously and beneficially adapted for use upon single wheel mounted pneumatic tires; moreover, that it can be and is capable of being mounted on equipped vehicle wheels in manners and by means different from that or those herein described—this without in any way departing from the scope or spirit of the invention.

We claim:

1. A pressure indicator for pneumatic tires comprising,
    (a) a tubular housing having a window therein intermediately of its ends chambered at one of its ends and formed with independent outwardly opening ways,
    (b) a piston slideably received in the housing having a rod of diameter less than the inside diameter of said housing extending longitudinally thereof,
(c) means of different colors on the piston rod registrable, at times, with the housing window,
(d) spring means of predetermined tension within the housing engaging the piston whereby to normally impart thrust in one direction thereto,
(e) means closing the remaining end of the housing, and,
(f) support engaging and attaching means on said housing.

2. A pressure indicator for pneumatic tires comprising,
(a) a tubular housing having a window therein intermediately of its ends chambered at one of its ends and formed with independent outwardly opening ways,
(b) a piston slideably received in the housing having a rod of diameter less than the inside diameter of the housing extending longitudinally thereof,
(c) a sleeve received on and about the rod in abutting engagement with the piston movable therewith and having outer surface portions of different colors registrable, at times, with the housing window,
(d) a coiled spring of predetermined compressive force over and about the piston rod one end of which engages the adjacent end of said sleeve,
(e) means closing the remaining end of the housing bearing on the remaining end of said spring, and,
(f) support attaching means on said housing.

3. A pressure indicator for pneumatic tires comprising,
(a) a tubular housing having a window therein intermediately of its ends chambered at one of its ends and formed with separate outwardly opening ways,
(b) a piston slidably received in the housing having a rod of diameter less than the inside diameter of the housing extending longitudinally thereof,
(c) means of different colors on the piston rod registrable, at times, with the housing window,
(d) a coiled spring of predetermined compressive force over and about the piston thrustingly engaging the piston,
(e) a closure engaged in the remaining end of the housing bearing on the remaining end of said spring, said closure having an inwardly opening pocket therein of shape and size sufficient to permit snug slidable reception of a portion of the piston rod therein, at times, and,
(f) support attaching means on said housing.

4. A pressure indicator for pneumatic tires comprising,
(a) a tubular housing having a window therein intermediately of its ends chambered at one of its ends and formed with separate outwardly opening ways and internally shouldered in spaced relation to the openings,
(b) a check valve assembly engaged in and communicable with one of said ways,
(c) a flexible conduit engaged at one of its ends in and communicating with the remaining way,
(d) a pneumatic tire valve engaging fitting on the remaining end of the conduit,
(e) a piston slideably received in the housing abuttingly engageable, at times, with said internal shoulder having a rod of diameter less than the inside diameter of the housing extending longitudinally thereof,
(f) a sleeve received on and about the piston rod in abutting engagement with the piston and movable therewith having outer surface portions of different colors registrable, at times, with the housing window,
(g) a coiled spring of predetermined compressive force over and about the piston rod one end of which engages the adjacent end of said sleeve,
(h) a closure plug engaged in the remaining end of the housing bearing on the remaining end of said spring, said closure plug having an inwardly opening pocket therein of shape and size sufficient to receive a portion of the piston rod therein, and,
(i) support attaching means on said housing.

5. A pressure indicator for pneumatic tires comprising,
(a) a tubular housing having a window therein intermediately of its ends chambered at one of its ends and formed with separate outwardly opening ways and internally shouldered in spaced relation to the openings,
(b) a check valve assembly engaged in and communicable with one of said ways,
(c) a flexible conduit engaged at one of its ends in and communicating with the remaining way,
(d) a pneumatic tire valve engaging fitting on the remaining end of the conduit,
(e) a transparent sleeve snugly received within the housing extending substantially throughout the length thereof having one of its ends abuttingly engaging said internal shoulder,
(f) a piston slideably received within the transparent sleeve abuttingly engageable, at times, with said internal shoulder and having a rod of diameter less than the inside diameter of said transparent sleeve,
(g) a second sleeve received on and about the rod within the transparent sleeve in abutting engagement with the piston and movable therewith having outer surface portions of different colors registrable, at times, with the housing window,
(h) a coiled spring of predetermined compressive force over and about the piston rod, one end of which engages the adjacent end of said second sleeve,
(i) a closure plug engaged in the remaining end of the housing bearing on the adjacent ends of the transparent sleeve and coiled spring, said plug having an inwardly opening pocket therein of shape and size sufficient to at times slideably receive a portion of the piston rod therein, and,
(j) support attaching means on said housing.

6. A pressure indicator for pneumatic tires comprising,
(a) a tubular housing having a window therein and a chamber at one of its ends communicating therewith formed with separate outwardly opening ways and internally shouldered adjacent its point of communication with said housing end and its remaining end closed,
(b) a transparent sleeve snugly received within the housing extending substantially throughout its length having one of its ends abuttingly engaging said internal shoulder and its remaining end abuttingly engaging the closed end of the casing,
(c) a piston slideably received in the sleeve having a rod extending therefrom longitudinally into the same, being of length less than said sleeve and housing,
(d) a second sleeve received on and about the rod within the transparent sleeve in abutting engagement with the piston having indicating means on its outer surface portions exposable through said window,
(e) a coiled spring of predetermined compressive force engaged over and about the rod endwise engaging the second sleeve and the housing closed end, and,
(f) support attaching means on said housing.

7. A pressure indicator for pneumatic tires comprising,
(a) a tubular housing having a window therein and a chamber at one of its ends communicating therewith formed with separate outwardly opening ways and internally shouldered adjacent its point of communication with the housing and its remaining end open,
(b) a transparent sleeve snugly received within the housing extending substantially throughout its length having one of its ends abuttingly engaging said internal shoulder,
(c) a piston slideably received in the sleeve having a rod extending therefrom longitudinally into the same being of a length less than said sleeve and housing, (d) a second sleeve received on and about the rod within the transparent sleeve in abutting engagement with the piston having indicating means on its outer surface portions exposable through the window, (e) a closure engaged in the open end of the housing engaging the remaining end of the transparent sleeve and having an inwardly opening pocket therein of shape and size whereby to, at times, snugly and slideably receive a portion of said rod, (f) a coiled spring of predetermined compressive force engaged over and about the rod endwise bearing on the second sleeve and the inner end of said closure outwardly of its inwardly opening pocket, and, (g) support attaching means on said housing.

References Cited by the Examiner

UNITED STATES PATENTS

| | | | |
|---|---|---|---|
| 919,658 | 4/09 | Washburn | 116—34 |
| 1,606,674 | 11/26 | Sutherland | 73—146.8 |
| 1,807,752 | 6/31 | Poster | 73—419 |
| 3,038,439 | 6/62 | Martin et al. | 116—117 |
| 3,106,183 | 10/63 | Schlanger | 116—34 |

LOUIS J. CAPOZI, *Primary Examiner.*